Patented Dec. 15, 1953

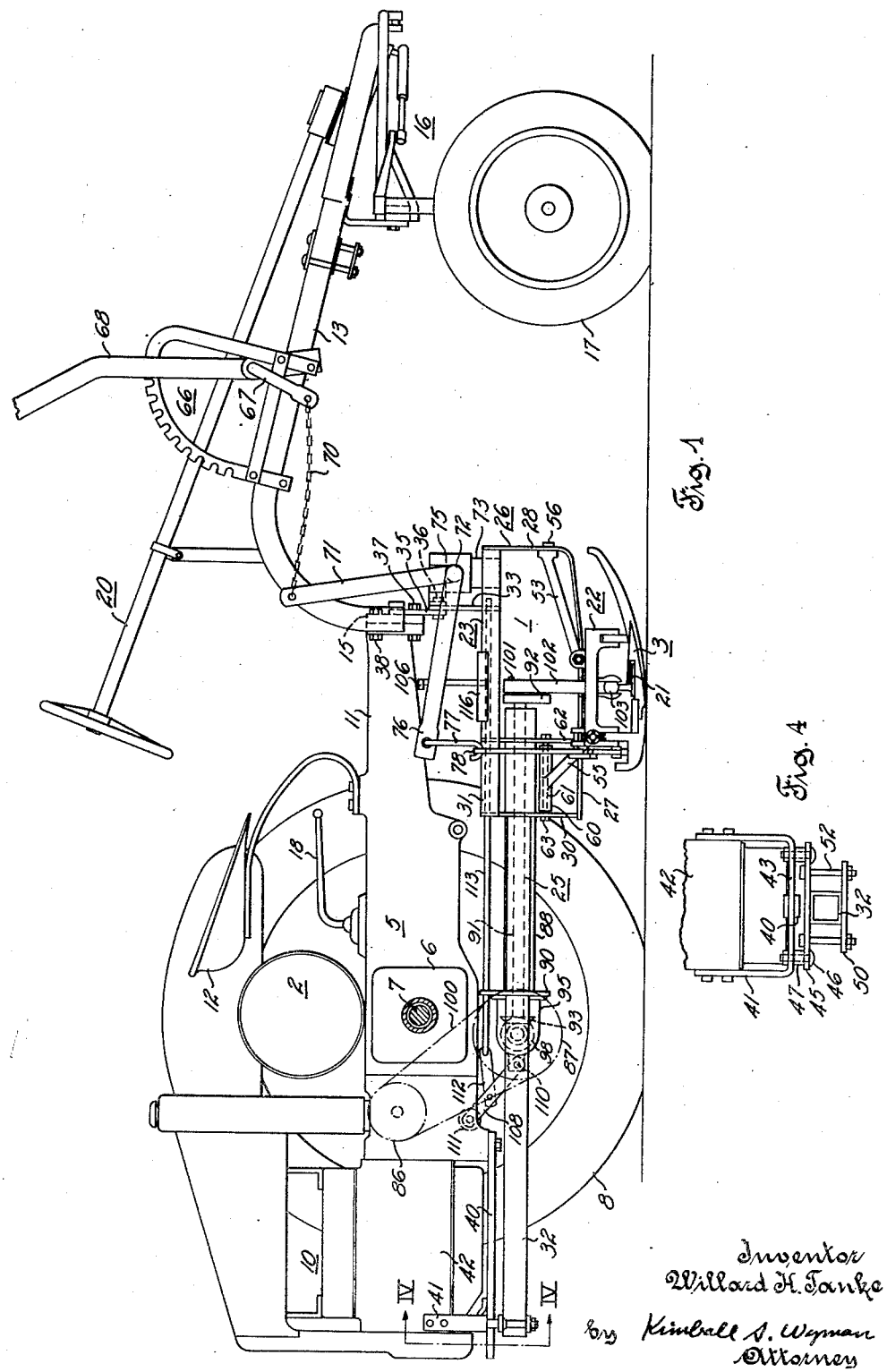

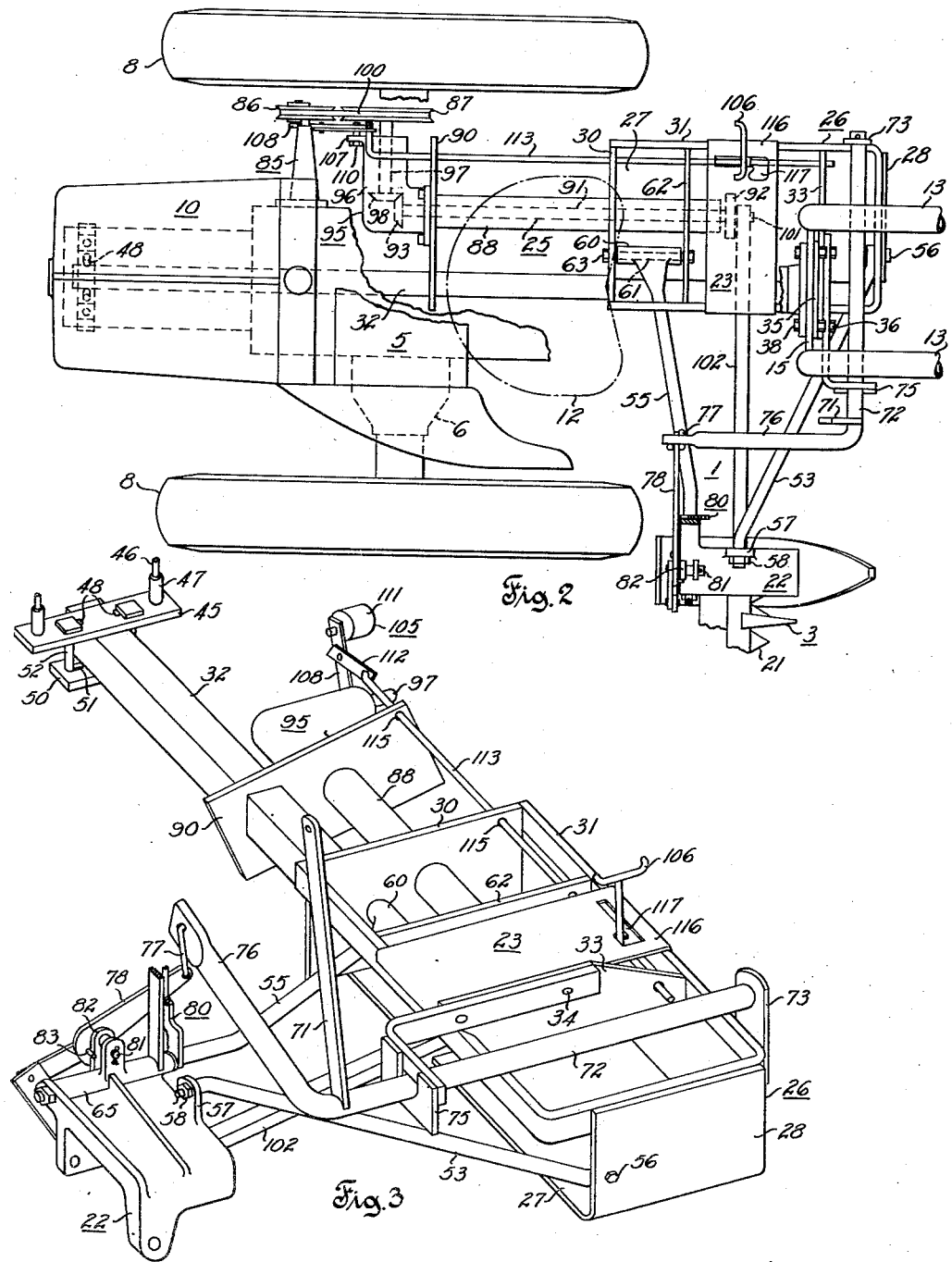

2,662,358

UNITED STATES PATENT OFFICE 2,662,358

TRACTOR MOWER ATTACHMENT

Willard H. Tanke, La Crosse, Wis., assignor to Allis-Chalmers Manufacturing Company, Milwaukee, Wis., a corporation of Delaware Application March 30, 1949, Serial No. 84,412

15 Claims. (Cl. 56—25)

This invention relates generally to a tractor attached mower and is more particularly concerned with improving the apparatus for detachably supporting and operating a side mounted mower, that is, a mower having a supporting frame structure which is disposed generally beneath a tractor and mounts a cutter bar positionable laterally outward from a side of the tractor immediately in advance of a rear traction wheel thereof.

In prior tractor attached mower combinations wherein the cutter bar extends laterally away from a side of the tractor at a point between the front and rear wheels thereof, the cutter bar pitman is usually connected with a rotary power take-off element on the tractor by means of a lay shaft which is preferably carried by the mower frame in order to facilitate removal of the mower as a unit and which has cranks or eccentrics adjacent opposite ends thereof connected, respectively, with one end of the mower pitman and with a connecting rod actuated by the tractor power take-off element. However, there are some attachments of this type, wherein the lay shaft is gear connected with the tractor power take-off element. And while arrangements such as these are generally satisfactory, it is essential that the crank or gear on the lay shaft be accurately aligned in driven relation to the tractor power take-off element, which in turn necessitates that the mower supporting frame be rigidly fixed to the tractor with such parts so aligned. Consequently, the mower supporting frame must be of rugged construction and fixedly secured to the tractor at three or more spaced points of support in order to obtain a degree of rigidity capable of maintaining driving and driven parts in accurate alignment.

All of this tends to increase the weight of the attachment and is further objectionable in that more time and effort are required to mount and demount the mower unit. In addition, the proper alignment of driving and driven parts is often extremely difficult and the wear of such parts is excessive because of dimensional variations resulting from the use of conventional tolerances in the manufacture and assembly of parts. In accordance with this invention, these and other objectionable features are eliminated or at least minimized through the use of an elongated mower supporting frame structure which is suspended beneath the tractor by means of a pair of remotely spaced supports (one of which is laterally adjustable) aligned in generally parallel relation to the longitudinal axis of the tractor and which mounts a power transmitting means for driving the cutter bar mechanism comprising a rotary power input element disposed adjacent the laterally adjustable support. And as a result, alignment of this element with a rotary power take-off drive element on the tractor can be readily effected by a slight lateral adjustment of this last mentioned support, such adjustment being afforded by the inherent flexibility of a frame structure supported as hereinabove indicated and as hereinafter more fully set forth in the detailed description, irrespective of whether the nonadjustable support includes a flexible web or plate type part as an element thereof.

It is therefore an object of the present invention to provide a side mounted mower attachment having a supporting frame incorporating improved features of construction and/or combination minimizing the number of parts to be connected or disconnected in mounting the mower attachment on a tractor or in removing it therefrom.

Another object of this invention is to provide an improved tractor side mounted mower combination affording ready access to those tractor and mower parts which must be connected or disconnected in mounting the mower on the tractor or in removing it therefrom.

Still another object of the present invention is to provide a side mounted mower attachment including parts constructed and combined for coaction with each other and with associated tractor parts in an improved manner rendering the mower drive mechanism carried by such an attachment readily connectable with a tractor power take-off shaft disposed generally at a right angle to the longitudinal axis of the tractor.

A further object of this invention is to provide an improved side mounted mower attachment affording a simplified, inexpensive construction which can be readily manufactured, attached to a tractor and adjusted thereon to obtain proper alignment of driving and driven parts, with a minimum of time, effort and skill.

A clear conception of apparatus for accomplishing one or more of the above stated and other objects will become readily apparent as the disclosure progresses and particularly points out those features and advantages considered of special importance.

And accordingly the present invention may be considered as comprising features of construction and/or combination as hereinafter more fully set forth in the detailed description and appended claims, reference being had to the accompanying drawings, in which:

Fig. 1 is a side view of an illustrative tractor mower combination with the rear side traction wheel removed and with other parts omitted or broken away in the interest of clarity;

Fig. 2 is a partial plan view of apparatus shown in Fig. 1;

Fig. 3 is an enlarged perspective view of the supporting frame for the mower attachment, looking rearwardly along the top of the frame; and Fig. 4 is an enlarged partial view taken along lines IV—IV in Fig. 1.

Referring to Fig. 1 it will be seen that the present invention is illustrated by a tractor mower combination wherein a side mounted mower 1 is disposed generally beneath the rear portion of a tractor 2 with the cutter bar 3 and associated parts extending outward from the tractor at a point intermediate the front and rear wheels of the tractor.

The tractor portion of the combination comprises generally a rear housing structure 5 including laterally extending portions 6 rotatably supporting a pair of driving axles 7 mounting a pair of laterally spaced ground engaging traction wheels 8 at opposite ends thereof, an engine 10 carried by housing structure 5 in rearwardly depending relation thereto and drivingly connected to the axles 7 by conventional means including a transmission and differential (not shown), a stub frame member 11 extending forwardly from the central portion of housing 5 and mounting an operator's seat or station 12 in elevated relation thereto immediately in advance of engine 10, a pair of laterally spaced upwardly arched tubular frame members 13 having their rear ends rigidly united by a transverse part 15 which in turn is fixed to the forward end of stub frame member 11, and a transverse front axle structure 16 secured to the forward end portions of tubular frame members 12 and supported on a pair of laterally spaced dirigible front wheels 17. The usual control devices for the tractor driving means are arranged within easy reach of an operator seated at station 12. In order to more clearly show the mower attachment, the mentioned controls, except for gear shift lever 18 and steering control means 20, have been omitted for the drawings. It is believed that the foregoing description of the tractor is sufficient for a complete understanding of the present invention.

Looking also at Figs. 2 and 3 it is noted that the mower 1 comprises generally a cutter bar 3, including knife portion 21, a mower head assembly 22, a supporting frame 23 for the mower head and a drive means 25 for transmitting power from the tractor engine to mower knife 21. Since the cutter bar may be of any conventional type only a portion thereof is shown (see Fig. 2).

The supporting frame 23 comprises a box type forward portion 26 having a horizontally disposed bottom plate member 27 terminating at forward and rearward ends thereof in a pair of parallel upstanding flange portions 28 and 30 which form the front and rear walls, respectively, of the box 26. The upper ends of flange portions 28 and 30 are additionally braced by a U-shaped bracket 31 fixed at its open end to opposite side edges of rear wall 30 and having its closed end fixed, as by welding, to the forward wall 28. Extending rearwardly from the rear wall of the box frame is an elongated tubular frame member or tail piece 32 forming the rear portion of the supporting frame.

For attaching supporting frame 23 to the tractor there is provided an upstanding part or web member 33 which is disposed in fixed relation between the inner sides of U-shaped bracket 31 in spaced parallel relation to forward wall 28. The upper portion of upstanding part 33 has a pair of laterally spaced bolt receiving openings 34 therethrough (see Fig. 3) and a vertical supporting plate member 35 having similarly spaced openings (not shown) along one edge thereof is fixed in upwardly extending adjacent relation to web member 33 by bolts 36, or the like, disposed through the aligned openings in the two members. Also, the upper edge portion of supporting plate member 35 has a pair of vertically spaced openings therethrough (not shown) for rigid attachment with the leading edge of tractor stub frame member 11 by bolts 37 or the like. In this connection it will be noted that part 15 uniting rear end portions of tubular frame members 13 is detachably secured to the forward end of stub frame member 11 by bolts 38 and 37 and the lower pair of these bolts are preferably of sufficient length to afford space therealong for mounting supporting plate 35 in surface abutting relation to part 15.

As shown more clearly in Fig. 1, the rear portion of tractor 2 carries a drawbar 40 pivotally attached at its forward end to the underside of central housing 5 and supported at its rear end by a bail 41 depending from the engine housing 42 and rigidly fixed at either side thereof. More specifically, the rear portion of drawbar 40 comprises vertically spaced bifurcated parts disposed with the horizontal portion 43 of bail 41 between them. A horizontal strap member 45 is detachably secured in underlying spaced parallel relation to bail portion 43, as by bolts 46 and spacer elements 47 and includes an additional pair of slotted bolt receiving openings 48 therethrough (see Figs. 2 and 4). A second horizontal strap member 50 is disposed in parallel spaced relation to strap member 45 and includes a pair of slotted bolt receiving openings 51 therethrough alignable with openings in overlying member 45. The two strap members are united by a pair of bolts 52 in sufficiently spaced relation to permit the insertion of the end of tubular member 32 therebetween. It will be noted that the lateral space between bolts 52 is appreciably greater than the width of tail piece 32 and, therefore, this member may be shifted laterally with respect to the tractor for purposes disclosed hereinafter. Tubular member 32 is rigidly fixed between strap members 45 and 50 against lateral movement by tightening bolts 52 to thereby afford a clamping action of the straps on tail piece 32.

It is evident, therefore, that the drawbar supporting structure just described affords means for adjustably securing the rear end of tubular member 32 to the tractor.

The cutter bar 3 and mower head assembly 22 are fixed to supporting frame 23 by tie members 53 and 55 which permit vertical movement of the assembly relative to the supporting frame and also permit tilting of the mower head about an axis normal to the longitudinal axis of the tractor. More particularly, the forward tie member 53 comprises a straight rod having opposite end portions bent in oppositely extended relation to the main portion of the rod with one end pivotally secured to flange 28 by bolt 56, or the like, and the other end journaled in an opening in a lug 57 projecting upwardly from the mower head and secured thereto by a nut 58. The rear tie member 55 connecting mower head assembly 22 with supporting frame 23 comprises a rod having a transversely disposed sleeve 60 fixed, as by welding, to one end thereof and having the opposite end portion bent at an angle to the main portion of the rod. Sleeve portion 60 is rotatably supported by a rod 61 positioned through aligned openings (not shown) in rear wall 30 and an intermediate wall portion 62 of box frame 26 and fixed therein against axial movement by nuts 63 on either end of rod 61. The opposite bent end portion of tie member 55 is positioned in a hollow tubular portion 65 of mower head 22 disposed in transverse relation to the longitudinal axis of the head. Thus, rear tie member 55 may be pivoted about rod 61 at one end and mower head assembly 22 is free to rotate relative to the opposite end of the rear tie member. And, in this connection, there is provided a conventional lever and quadrant arrangement 80 affording means for tilting or rotating mower head assembly 22 relative to rear tie member 55.

Mounted on the arched portion 13 of the tractor frame is a lift means 66 comprising a rock shaft 67 and a lever 68 for operating same. Rock shaft 67 is connected, as by chain 70, to a vertically extending arm 71 fixed to a second rock shaft 72 journaled in brackets 73 and 75 carried by the forward portion of supporting frame 23 and operably connected to mower head 22 through lift arm 76, link 77 and arm 78. Arm 78 includes a laterally projecting pin 81 rotatably mounted in aligned openings (not shown) in an upstanding bracket 82, fixed to the mower head, thereby affording a swinging movement of arm 78 relative to mower head 22 upon actuation of lift means 66, and a stop pin 83 fixed on the adjacent end portion of arm 78 is positioned for engagement with bracket 82 to limit said swinging movement of arm 78. Accordingly, the initial movement of lift lever 68, rearwardly from the position shown in Fig. 1, moves lift arm 67 forward which in turn effects a forward movement of arm 71 on the mower rock shaft, and an upward swinging movement of mower lift arm 76 and arm 78. However, when stop pin 83 strikes bracket 82, arm 78 ceases to pivot about its projecting pin 81 and any further movement of lever 68, in the direction indicated, causes lift arm 76 to raise arm 78 and, consequently, the entire mower head and cutter bar assembly with respect to the ground.

For affording a reciprocating movement of the sickle or knife 21 relative to cutter bar 3 there is provided a suitable driving means 25. It will be noted in Fig. 2 that the rear portion of tractor rear housing 5 includes a projecting shaft or power take-off 85 which is driven from engine 10 in any suitable manner, preferably for constant speed rotation, and which shaft has a belt pulley 86 fixed to the outer end for rotation therewith. A second belt pulley 87 adapted for longitudinal alignment with power take-off pulley 86 is rotatably mounted on mower supporting frame 23 and drivingly connected with knife 21 of the mower. Specifically, rear wall 30 and intermediate wall 62 of box frame 26 have aligned circular openings therethrough (not shown) receiving an elongated hollow member 88 which extends rearwardly in parallel relation to frame tail piece 32 and is supported at its rear end by a transverse plate member 90 fixed to the adjacent portion of tail piece 32. Rotatably mounted in suitable bearings (not shown) at either end of tubular member 88 is a long drive shaft 91 having a circular part or flywheel 92 fixed at its forward end for rotation therewith and a bevel gear 93 fixed at its rear end for rotation therewith. Detachably secured to plate member 90 in covering relation to bevel gear 93 and the adjacent rear portion of drive shaft 91 is a housing structure 95 which includes a transversely extending portion 96 rotatably supporting a stub shaft 97 having a bevel gear 98 fixed at its inner end in meshing relation with bevel gear 93. The outer end of stub shaft 97 has belt pulley 87 fixed thereto for rotation therewith. Drive is transmitted from power take-off pulley 86 to mower belt pulley 87 by any suitable means such as V-belt 100.

Flywheel 92 carried by the forward end of drive shaft 91 has a pin 101 fixed at a point adjacent the outer edge of the flywheel in forwardly extending relation thereto and pivotally secured at one end to pin 101 is a pitman 102 having a ball and socket connection 103 at its opposite end with knife 21. Thus it is seen that rotation of drive shaft 91 by engine 10 through power take-off pulley 86, V-belt 100, mower belt pulley 87 and shafts 97 and 91 results in a reciprocating movement of pitman 102 which in turn moves knife 21 back and forth across cutter bar 3.

And for controlling the transmission of power from tractor belt pulley 86 to mower belt pulley 87 there is provided a belt tightening idler 105 which is constructed and arranged for actuation by movement of a foot pedal 106 disposed within easy reach of an operator seated at station 12 on the tractor. In detail, pulley shaft housing 95 has a rearwardly projecting lug 107 at its outer end which has a bolt receiving opening therethrough (not shown) for pivotally attaching one end of a strap member 108 by means of bolt 110. The free end of strap member 108 rotatably mounts an idler pulley 111 positionable to engage V-belt 100. Pivotally attached to a mid-portion of strap 108 is a link 112 which in turn is pivotally connected to a rear end portion of a rod 113 carried by aligned openings 115 through vertical portions of supporting frame 23 for sliding movement relative thereto. The forward end of rod 113 has fixed thereto, as by welding, a vertically extending pedal 106. For positioning idler pulley 111 in either a belt tightening or released position there is provided a pedal lock in the form of a horizontal plate 116, carried by box frame 26, which includes a cut out portion 117 through which pedal 106 protrudes affording selective positioning of the pedal to either tighten belt 100 and thus convey power from the tractor pulley to the mower pulley or to release idler pulley 111 from engagement with belt 100 and thereby permit tractor pulley 86 to rotate relative to the belt.

And in connection with the driving means just described it has been found that for efficient operation of this type of drive it is necessary that the pulley sheaves be in exact longitudinal alignment. Therefore, there has been provided the lateral adjusting means for the supporting frame tail piece 32 which has been previously described.

An attachment for a tractor, such as the mower attachment just described, which is normally put on and taken off the tractor many times each year cannot be expected to line up in exactly the same relation to the tractor each time and where such alignment is necessary or highly desirable some adjustment must be afforded. Consequently the rear end of supporting frame 23 has been designed for lateral adjustment relative to the tractor thereby affording a corresponding shifting movement of mower pulley 87 relative to the tractor pulley 86. More specifically, in attaching plate member 33 to the tractor attaching bolts 36 are initially left loose, as are clamping bolts 52 for tail piece 32, and mower pulley 87 is aligned with tractor pulley 86 before tightening bolts 36 and 52. Plate 33 being a relatively flexible web member is adapted to take sufficient torsional stresses to permit a positioning of the rear end of tail piece 32 in laterally offset relation to its normal position in longitudinal alignment with the front end of tail piece 32 and a center portion of attaching plate 33. And, in this connection is should be noted that the torsional effect on web plate 33 is minimized by constructing the mower supporting frame so that the opposite end portions of tail piece 32 and the center portion of attaching plate 33 are in general longitudinal alignment with one another, and also, by positioning the alignable sheave 87 in longitudinally spaced laterally offset relation to web 33 so that lateral movement of the rear end of tail piece 32 a given distance effects an approximately equal lateral movement of sheave 87. Moreover, such an effect may be obtained in large part due to the inherent flexibility of a relatively long frame supported at only two remotely spaced points as herein shown and described, and it should therefore be apparent that the extent of adjustment necessary to accurately align the driving and driven parts after such parts are brought into approximate alignment by attachment of the mower frame to the tractor can in fact be practically achieved irrespective of whether the front support includes the preferable web plate construction disclosed.

Furthermore, in addition to providing a ready adjustment of supporting frame 23 for aligning the mower pulley with the tractor power take-off pulley, it will be noted that apparatus constructed in accordance with the present invention also affords quick attachment and detachment of the mower supporting frame with tractor 1 at points thereon which are readily accessible to the operator. In this connection it should be understood that supporting plate member 35 at the forward end of tractor stub frame member 11 and strap members 45 and 50 (fixed to drawbar bail 41) may be left on the tractor at all times without interfering in any way with other implements or attachments that may be used. And for connecting mower supporting frame 23 thereto, tractor 1 is readily maneuverable to place the forward frame portion thereof in overlying position with respect to supporting frame 23 whereupon the forward box portion 26 may be secured to plate member 35 by bolts 36 and tail piece 32 may be adjustably fixed between strap members 45 and 50 at the rear of the tractor. Once the mower frame is thus mounted on the tractor all that need be done to make the attachment operative is to place the belt 100 on the aligned pulleys. And it will be apparent that by following a reverse procedure the mower may be readily disconnected from the tractor.

It should now be obvious that although the apparatus shown and described as embodying the invention has particular utility in connection with mounting a mower on a tractor of the type herein disclosed, certain features are of more general application and that, therefore, it is not intended to limit the invention to the exact constructions and combinations herein disclosed as various modifications within the scope of the appended claims may occur to persons skilled in the art.

It is claimed and desired to secure by Letters Patent:

1. In a tractor having a rotary power take-off element, the combination of a mower attachment comprising, an elongated frame mounted to extend longitudinally of the tractor in underslung relation thereto substantially only through means of first and second supports detachably secured to said tractor and carried, respectively, by opposite end portions of said frame disposed in general alignment longitudinally of the tractor, said frame being flexible sufficiently to afford a limited lateral movement of one end thereof relative to the other end upon loosening the support carried by said one end, said first support being adjustably fixedly associated with said one end of said frame to provide lateral adjustment of said one end of said frame relative to said first support, and a power transmitting means mounted on said frame and presenting a rotary power input element disposed adjacent said one end of said frame in a position such that upon attachment of said frame to the tractor said power input element is disposed in approximate alignment with said power take-off element, and such that an accurate alignment of said elements can readily be effected simply by transversely shifting said one end of said frame an amount afforded by said adjustable support and the inherent flexibility of said frame.

2. In a tractor having a rotary power take-off element, the combination of a mower attachment comprising, an elongated frame mounted to extend longitudinally of the tractor in underslung relation thereto substantially only through means of first and second supports detachably secured to said tractor and carried, respectively, by opposite end portions of said frame disposed in general alignment longitudinally of the tractor, said second support including a web-like part disposed transversely with respect to the longitudinal axis of said tractor, said first support including relatively movable parts affording adjustment of said one end of said frame transversely of said axis relative to said first support, and a power transmitting means mounted on said frame and presenting a rotary power input element disposed adjacent said one end in a position such that upon attachment of said frame to said tractor said power input element is disposed in approximate alignment with said power take-off element, and such that an accurate alignment of said elements can readily be effected simply by transversely shifting said one end of said frame an amount afforded by the lateral adjustment of said first support and the inherent flexibility of said web-like part of said second support.

3. In a tractor having a wheel supported rear axle structure, having a centrally disposed drawbar structure rearward of said axle structure, and having a rotary power take-off element disposed rearwardly adjacent said axle structure, the combination of a mower attachment comprising, an elongated frame mounted to extend longitudinally of the tractor in underslung relation thereto substantially only through means of first and second supports detachably secured to said tractor and carried, respectively, by rear and front end portions of said frame in general alignment with the central longitudinal axis of said tractor, said second support including a web-like part secured to said tractor at a point in advance of the rear wheels thereof with said web-like part disposed transversely with respect to said axis, said frame and said web-like part of said second support being flexible sufficiently to afford a limited relative movement of the rear end of said frame transversely of said axis, said first support being secured to said drawbar structure at the rear end thereof and including relatively movable parts affording adjustment of said rear end of said frame transversely of said axis relative to said first support, and a power transmitting means mounted on said frame presenting a rotary power input element disposed in a position to the rear of said axle structure such that upon attachment of said frame to said tractor said power input element is disposed in approximate alignment with said power take-off element, and such that an accurate alignment of said elements can readily be effected simply by transversely shifting said rear end of said frame an amount afforded by the lateral adjustment of said first support and the inherent flexibility of said web-like part and frame.

4. In a tractor having a wide rear axle structure and having a power take-off shaft disposed generally at a right angle to the longitudinal axis of the tractor and presenting an exposed outer end portion connectable in power transmitting relation to a part adapted to be driven thereby, the combination of a mower attachment comprising, an elongated frame mounted to extend longitudinally of the tractor in underslung relation thereto substantially only through means of a first support securing the rear end of said mower frame to the underside of a rear portion of said tractor in proximity to the central longitudinal axis thereof, and through means of a second support securing a forward portion of said mower frame to the underside of the tractor at a point in advance of said rear axle structure and in general longitudinal alignment with said first support, said frame being flexible sufficiently to afford a limited lateral movement of one end thereof relative to the other end upon loosening the support carried by said one end, said first support including relatively movable parts affording adjustment of said rear end of said frame laterally of said axis relative to said second support, and a power transmitting means carried by said mower frame and including a rotatable shaft supported adjacent said rear end in a position such as to be disposed in adjacent and approximate parallel relation to said power take-off shaft by attachment of said mower frame to said first and second supports, and such that an exact parallel relationship of said shafts can be obtained simply by transversely shifting said rear end of said frame an amount afforded by the lateral adjustment of said first support and the inherent flexibility of said frame, said frame carried rotatable shaft presenting an outer end portion adapted for driven connection with the outer end of said power take-off shaft.

5. In a tractor having a wide rear axle structure and having a rotary power take-off element, the combination of a mower attachment comprising, an elongated and somewhat laterally flexible frame having a box type forward portion detachably secured to the underside of said tractor in proximity to the central longitudinal axis thereof and in advance of said rear axle structure and having a rearwardly projecting tail piece presenting a rear end detachably secured to a first support on said tractor for adjustment relative thereto laterally of the longitudinal axis of said tractor, said box type portion being carried by a second support depending from said tractor in general longitudinal alignment with said first support, said frame being carried by said tractor substantially only through means of said first and second supports, and a power transmitting means mounted on said mower frame and presenting a rotary power input element disposed adjacent a rear portion of said tail piece in a position such that upon attachment of said frame to the tractor said power input element is disposed in approximate alignment with said power take-off element, and such that an accurate alignment of said elements can readily be effected simply by transversely shifting said tail piece relative to said first support an amount afforded by the lateral flexibility of said frame.

6. In a tractor having front and rear axle structures united by a narrow frame extending forwardly from said rear axle structure, an underslung bail positioned rearwardly of and below said rear axle structure, and having a rotary power take-off element, the combination of a mower attachment comprising, an elongated frame supporting a mower head and cutter bar assembly adjacent the forward end thereof and being mounted to extend longitudinally of the tractor in underslung relation beneath the rear portion of said narrow frame and beneath said rear axle structure substantially only through means of a first support depending from said bail and including relatively movable parts affording adjustment of the rear end of said frame laterally of the tractor relative to said bail, and through means of a second support depending from a portion of said narrow frame in advance of said rear axle structure and detachably secured to a forward portion of said frame, said frame being flexible sufficiently to afford a limited lateral movement of said rear end of said frame relative to the forward end thereof upon loosening said first support, and a power transmitting means mounted on said mower frame and including a rotary power input element disposed adjacent said rear end of said frame in a position such that upon attachment of said frame to said tractor said power input element is disposed in approximate alignment with said power take-off element, and such that an accurate alignment of said elements can readily be effected simply by transversely shifting said rear end of said frame an amount afforded by the lateral flexibility of said frame and by the lateral adjustment of said rear end of said frame as afforded by said first support.

7. In a tractor having a wide rear axle structure, a power take-off shaft disposed generally at a right angle to the longitudinal axis of the tractor and immediately rearward of said rear axle structure and presenting an exposed outer end portion connectable in power transmitting relation to a part adapted to be driven thereby, and having an underslung drawbar bail positioned rearwardly of and below said power take-off shaft, the combination of a mower attachment comprising, an elongated frame detachably mounted to extend longitudinally of the tractor in underslung relation relative thereto substantially only through means of a first support securing the rear end of said mower frame to the underside of said drawbar bail in proximity to the central longitudinal axis of said tractor, and through means of a second support securing a forward portion of said mower frame to the underside of the tractor at a point in advance of said rear axle structure and in general longitudinal alignment with said first support, said first support including relatively movable parts affording adjustment of said rear end of said frame laterally of the tractor relative to said axis and relative to said first support, said frame being flexible sufficiently to afford a limited lateral movement of said rear end of said frame relative to the forward end thereof upon loosening said first support, and a power transmitting means carried by said mower frame and including a rotatable shaft supported adjacent said rear end thereof in position to be disposed in approximate parallel relation to said power take-off shaft by attachment of said mower frame to said first and second supports, and such that an exact parallel relationship of said shafts can be obtained simply by transversely shifting said rear end of said frame an amount afforded by said first support and the lateral flexibility of said frame, said rotatable shaft presenting an outer end adapted for driven connection with said outer end portion of said power take-off shaft.

8. In a tractor having a wide rear axle structure and a rotary power take-off element, the combination of a mower attachment comprising, a frame including a box type forward section mounting an upstanding web-like part intermediate the front and rear sides thereof, said web-like part having a detachable supported connection with said tractor at a point in advance of said rear axle structure and in proximity to the central longitudinal axis of said tractor, and including an elongated tail piece extending away from the rear side of said box type section with its forward and rear ends in general alignment with said upstanding part, a rear support means for securing the rear end portion of said tail piece to said tractor at a point in rear of said axle structure for adjustment of said tail piece laterally of the tractor relative to said axis, said web-like part and rear support means affording substantially the only supports for said frame, and said web-like part being flexible sufficiently to afford limited movement of the rear end of said tail piece laterally of the tractor, and a mower drive mechanism carried by said frame and comprising a rotatable power input element supported in position to the rear of said box type section so as to be disposed in approximate alignment with said rotary power take-off element upon attachment of said frame to said tractor, and so as to afford an accurate alignment of said elements by transversely shifting the rear end portion of said tail piece laterally of the tractor an amount afforded by said rear support and the flexibility of said web-like part.

9. An implement supporting frame adapted to be mounted in underslung relation beneath a conventional tractor having a rotary power take-off element, said frame comprising a box type forward section mounting an upstanding and somewhat flexible part intermediate the front and rear sides thereof and comprising an elongated tail piece extending away from the rear side of said box type section with its forward and rear ends in general alignment with said upstanding part, said part being adapted for detachable supported connection with an overlying tractor carried support, an attaching means carried by a rear end portion of said tail piece and adapted to be secured to a tractor carried support, said attaching means including relatively movable elements affording a limited lateral shifting of said rear end of said tail piece relative to the tractor carried support therefor, said upstanding part and attaching means constituting substantially the only supports connecting said implement frame with a tractor mounting same, and an implement drive mechanism carried by said frame and comprising a rotatable power input element supported in position to the rear of said box type section so as to be disposed in approximate relation to and aligned with said rotary power take-off element through attachment of said frame to the underside of the tractor coupled with a lateral shifting of said tail piece within limits afforded by the flexibility of said part.

10. An implement supporting frame adapted to be mounted in underslung relation beneath a conventional tractor having a rotary power take-off element, said frame comprising a box type forward section mounting an upstanding part intermediate the front and rear sides thereof and comprising an elongated tail piece extending away from the rear side of said box type section with its forward and rear ends in general alignment with said upstanding part, said part being adapted for detachable supported connection with an overlying tractor carried support member, means for detachably securing the rear end of said tail piece to an overlying tractor carried support for adjustment transversely with respect to the longitudinal axis of the tractor, said upstanding part and means affording, when secured to parts of an overlying tractor, substantially the only supports for said frame, and an implement drive mechanism carried by said frame and comprising a rotatable power input element supported in position on said frame so as to be disposed in approximate alignment with said rotary power take-off element through attachment of said frame to the underside of the tractor, said frame and upstanding part being sufficiently flexible to afford a limited lateral shifting of the rear end of said tail piece relative to a tractor carried support therefor.

11. An implement supporting frame adapted to be mounted in underslung relation beneath a tractor having a wide rear axle structure and having a rotary power take-off element carried by a shaft disposed generally at a right angle to the longitudinal axis of the tractor, said frame comprising a box type forward section including in spaced relation a front wall and a rear wall, an upstanding and somewhat flexible web-like part disposed intermediate said front and rear walls in generally parallel relation thereto, and comprising an elongated tail piece extending away from the outer side of said rear wall with its forward and rear ends generally disposed in a longitudinal vertical plane normal to said upstanding part, said web-like part being adapted for detachable connection with an overlying tractor carried support, an attaching means having relatively movable parts for laterally adjustably securing the rear end portion of said tail piece to an overlying tractor carried support, said upstanding part and attaching means constituting substantially the only supports connecting said implement frame with a tractor mounting same, and an implement drive mechanism carried by said frame and comprising a laterally projecting rotatable shaft having a rotary power input element fixedly secured at the outer end thereof so as to be disposed in approximate alignment with said rotary power take-off element through attachment of said frame to the underside of the tractor, said part being adapted for fixed supported connection with an overlying tractor part and being sufficiently flexible when thus connected to afford a limited lateral shifting of said tail piece relative to a vertical plane common to said part and to the forward and rear ends of said tail piece.

12. An implement supporting frame adapted to be mounted in underslung relation beneath a conventional tractor having a rotary power take-off element, said frame comprising a box type forward section mounting an upstanding part intermediate the front and rear sides thereof and comprising an elongated tail piece extending away from the rear side of said box type section with its forward and rear ends in general alignment with said upstanding part, said part being adapted for detachable supported connection with an overlying tractor carried support, an attaching means carried by a rear end portion of said tail piece and adapted to be secured to a tractor carried support, said attaching means including relatively movable elements affording a limited lateral shifting of said rear end of said tail piece relative to the tractor carried supports therefor, said upstanding part and attaching means constituting substantially the only supports connecting said implement frame with a tractor mounting same, and an implement drive mechanism carried by said frame and comprising a rotatable power input element supported in proximate relation to and aligned with said rotary power take-off element through attachment of said frame to the underside of the tractor coupled with a lateral shifting of said tail piece within limits afforded by the flexibility of said frame.

13. In a tractor having a rotary power take-off element, the combination of a mower attachment comprising, an elongated frame supporting a mower head and a cutter bar and being mounted to extend longitudinally of the tractor in underslung relation thereto substantially only through means of first and second supports detachably secured to said tractor and carried, respectively, by opposite end portions of said frame, said first and second supports being disposed in general alignment longitudinally of the tractor, said frame being flexible sufficiently to afford a limited lateral movement of one end thereof relative to the other end upon loosening the support carried by said one end, said mower head and cutter bar being positioned adjacent said other end of said frame, said first support having relatively movable parts for laterally adjustably securing said one end of said frame relative to said other end thereof and relative to the longitudinal axis of said tractor, and cutter bar driving means mounted on said frame and presenting a rotary power input element disposed adjacent said one end of said frame in a position such that upon attachment of said frame to said tractor said power input element is disposed in aproximate alignment with said power take-off element, and such that an accurate alignment of said elements can readily be effected simply by transversely shifting said one end of said frame an amount afforded by said relatively movable parts and the inherent flexibility of said frame.

14. In a tractor having a rotary power take-off element, the combination of a mower attachment comprising, an elongated frame supporting a mower head and a cutter bar and being mounted to extend longitudinally of the tractor in underslung relation thereto substantially only through means of first and second supports detachably secured to said tractor and carried, respectively, by opposite end portions of said frame, said first and second supports being disposed in general alignment longitudinally of the tractor, said second support being flexible sufficiently to afford a limited lateral movement of one end of said frame relative to the other end thereof upon loosening the support carried by said one end, said first support being adjustably fixedly positioned relative to said one end of said frame to provide lateral adjustment of said one end of said frame relative to said other end thereof, said mower head and cutter being positioned adjacent said other end of said frame, and cutter bar driving means mounted on said frame and presenting a rotary power input element disposed in proximate relation to said first support and in a position such that upon attachment of said frame to the tractor said power input element is disposed in approximate alignment with said power take-off element, and such that an accurate alignment of said elements can readily be effected simply by transversely shifting said one end of said frame an amount afforded by the adjustability of said first support and by the inherent flexibility of said second support.

15. In a tractor having a wheel supported rear axle structure and a rotary power take-off element disposed rearwardly adjacent the rear axle structure, the combination of a mower attachment comprising, an elongated frame supporting a mower head and a cutter bar assembly and being mounted to extend longitudinally of the tractor in underslung relation thereto through substantially only means of first and second supports detachably secured to said tractor and carried, respectively, by opposite end portions of said frame, said first and second supports being disposed in general alignment longitudinally of the tractor with said second support secured to said tractor at a point in advance of the rear wheels thereof and with said first support secured to said tractor rearwardly of said rear axle structure, said frame being sufficiently flexible to afford a limited lateral movement of one end thereof relative to the other end upon loosening the support carried by said one end, said first support including relatively movable parts affording adjustment of said one end of said frame laterally of the longitudinal axis of the tractor relative to said first support, said mower head and cutter bar assembly being positioned adjacent said other end of said frame, and cutter bar driving means mounted on said frame and presenting a rotary power input element disposed in a position to the rear of said axle structure such that upon attachment of said frame to said tractor said power input element is disposed in approximate alignment with said power take-off element, and such that an accurate alignment of said elements can readily be effected simply by laterally shifting said one end of said frame an amount afforded by the lateral adjustment of said first support and the inherent flexibility of said frame.

WILLARD H. TANKE.

References Cited in the file of this patent
UNITED STATES PATENTS

| Number | Name | Date |
|---|---|---|
| 1,620,099 | Hover | Mar. 8, 1927 |
| 1,761,904 | Champion | June 3, 1930 |
| 1,854,649 | Frank | Apr. 19, 1932 |
| 1,860,247 | Horste | May 24, 1932 |
| 2,060,280 | Clapper | Nov. 10, 1936 |
| 2,065,901 | Leavitt | Dec. 29, 1936 |
| 2,098,948 | Foushee | Nov. 16, 1937 |
| 2,259,864 | Smith | Oct. 21, 1941 |
| 2,292,943 | Horste | Aug. 11, 1942 |
| 2,293,170 | Pokluda | Aug. 18, 1942 |
| 2,307,826 | Donason | Jan. 12, 1943 |
| 2,320,057 | Tanke | May 25, 1943 |
| 2,449,315 | Partin | Sept. 14, 1948 |
| 2,482,251 | Downing et al. | Sept. 20, 1949 |
| 2,543,310 | Andrews et al. | Feb. 27, 1951 |